US008049719B2

(12) United States Patent
Wilson et al.

(10) Patent No.: US 8,049,719 B2
(45) Date of Patent: *Nov. 1, 2011

(54) VIRTUAL CONTROLLER FOR VISUAL DISPLAYS

(75) Inventors: Andrew David Wilson, Seattle, WA (US); Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/904,820

(22) Filed: Oct. 14, 2010

(65) Prior Publication Data

US 2011/0025601 A1   Feb. 3, 2011

Related U.S. Application Data

(63) Continuation of application No. 11/463,183, filed on Aug. 8, 2006.

(51) Int. Cl.
*G09G 5/00* (2006.01)
(52) U.S. Cl. .................. 345/156; 382/103
(58) Field of Classification Search .......... 345/98, 345/156, 173; 382/103, 199, 257
See application file for complete search history.

(56) References Cited

U.S. PATENT DOCUMENTS

| 5,404,458 | A |   | 4/1995  | Zetts |
| 5,483,261 | A |   | 1/1996  | Yasutake |
| 5,594,469 | A | * | 1/1997  | Freeman et al. ............. 345/158 |
| 6,115,482 | A |   | 9/2000  | Sears et al. |
| 6,181,343 | B1 |  | 1/2001  | Lyons |
| 6,195,104 | B1 |  | 2/2001  | Lyons |
| 6,204,852 | B1 |  | 3/2001  | Kumar et al. |
| 6,269,172 | B1 |  | 7/2001  | Rehg et al. |
| 6,417,836 | B1 |  | 7/2002  | Kumar et al. |
| 6,531,999 | B1 |  | 3/2003  | Trajkovic |
| 6,594,616 | B2 |  | 7/2003  | Zhang et al. |
| 6,600,475 | B2 |  | 7/2003  | Gutta et al. |
| 6,624,833 | B1 |  | 9/2003  | Kumar et al. |
| 6,771,834 | B1 | * | 8/2004  | Martins et al. ............... 382/257 |
| 6,804,396 | B2 |  | 10/2004 | Higaki et al. |
| 6,888,960 | B2 |  | 5/2005  | Penev et al. |
| 6,996,460 | B1 |  | 2/2006  | Krahnstoever et al. |
| 7,007,236 | B2 |  | 2/2006  | Dempski et al. |

(Continued)

FOREIGN PATENT DOCUMENTS

EP     1653391 A2    5/2006

(Continued)

OTHER PUBLICATIONS

Cutler, et al., "View-based Interpretation of Real-time Optical Flow for Gesture Recognition", 6 pages.

(Continued)

*Primary Examiner* — Quan-Zhen Wang
*Assistant Examiner* — Yuk Chow
(74) *Attorney, Agent, or Firm* — Lee & Hayes, PLLC

(57) ABSTRACT

Virtual controllers for visual displays are described. In one implementation, a camera captures an image of hands against a background. The image is segmented into hand areas and background areas. Various hand and finger gestures isolate parts of the background into independent areas, which are then assigned control parameters for manipulating the visual display. Multiple control parameters can be associated with attributes of multiple independent areas formed by two hands, for advanced control including simultaneous functions of clicking, selecting, executing, horizontal movement, vertical movement, scrolling, dragging, rotational movement, zooming, maximizing, minimizing, executing file functions, and executing menu choices.

20 Claims, 5 Drawing Sheets

U.S. PATENT DOCUMENTS

| | | | |
|---|---|---|---|
| 7,095,401 | B2 | 8/2006 | Liu et al. |
| 7,372,977 | B2 | 5/2008 | Fujimura et al. |
| 2002/0118880 | A1* | 8/2002 | Liu et al. .................. 382/199 |
| 2002/0140667 | A1 | 10/2002 | Horiki |
| 2003/0156756 | A1 | 8/2003 | Gokturk et al. |
| 2003/0214481 | A1 | 11/2003 | Xiong |
| 2004/0001113 | A1 | 1/2004 | Zipperer et al. |
| 2004/0155902 | A1 | 8/2004 | Dempski et al. |
| 2004/0189720 | A1 | 9/2004 | Wilson et al. |
| 2005/0088409 | A1 | 4/2005 | Van Berkel |
| 2005/0151850 | A1 | 7/2005 | Ahn et al. |
| 2005/0212753 | A1 | 9/2005 | Marvit et al. |
| 2005/0238201 | A1 | 10/2005 | Shamaie |
| 2005/0255434 | A1 | 11/2005 | Lok et al. |
| 2006/0007142 | A1 | 1/2006 | Wilson et al. |
| 2006/0012571 | A1 | 1/2006 | Rodgers et al. |
| 2006/0036944 | A1 | 2/2006 | Wilson |
| 2006/0092267 | A1 | 5/2006 | Dempski et al. |
| 2006/0178212 | A1 | 8/2006 | Penzias |
| 2006/0209021 | A1 | 9/2006 | Yoo et al. |
| 2007/0252898 | A1 | 11/2007 | Delean |
| 2008/0036732 | A1 | 2/2008 | Wilson et al. |
| 2008/0122786 | A1 | 5/2008 | Pryor et al. |
| 2008/0193043 | A1 | 8/2008 | Wilson |

FOREIGN PATENT DOCUMENTS

| | | | |
|---|---|---|---|
| JP | 2002259046 | A | 9/2002 |
| JP | 2006059147 | A | 3/2006 |
| JP | 2006178948 | A | 7/2006 |
| RU | 2175143 | C1 | 10/2001 |
| WO | WO2006020305 | A2 | 2/2006 |

OTHER PUBLICATIONS

Horain, et al., "3D Model Based Gesture Acquisition Using a Single Camera", Sixth IEEE Workshop on Applications of Computer Vision, 2002, p. 158.

Huang, et al., "Dynamic Gesture Analysis and Tracking Based on Dominant Motion Estimation and Kalman Filter", University of Erlangen-Numberg, Department of Computer Science, 8 pages.

Zieren, et al., "Hands Tracking from Frontal View for Vision-Based Gesture Recognition", Aachen University, Chair of Technical Computer Science, 8 pages.

Morris, et al., "User-Defined Gesture Set for Surface Computing", U.S. Appl. No. 12/185,166, filed Aug. 4, 2008, 47 pages.

Wilson, et al., "Computer Vision-Based Multi-Touch Sensing Using Infrared Lasers", U.S. Appl. No. 12/118,955, filed May 12, 2008, 38 pages.

Wilson, et al., "Determining Orientation in an External Reference Frame", U.S. Appl. No. 12/256,747, filed Oct. 23, 2008, 26 pages.

Wilson, et al., "Magic Wand", U.S. Appl. No. 11/939,739, filed Nov. 14, 2007, 47 pages.

The Russian Office Action dated Mar. 30, 2011 for Russian Patent Application No. 2009104062, a counterpart foreign application of US Patent No. 7,907,117.

Translated Chinese Office Action mailed May 20, 2011 for Chinese patent application No. 200780092522.2, a counterpart foreign application of US patent No. 7,907,117.

The Mexican Office Action mailed Jun. 9, 2011 for Mexican patent application No. MX/a/2009/000305, a counterpart foreign application of US patent No. 7,907,117, 2 pages.

* cited by examiner

VIRTUAL CONTROLLER FOR VISUAL DISPLAYS

RELATED APPLICATION

This application is a continuation of and claims priority to U.S. patent application Ser. No. 11/463,183, filed on Aug. 8, 2006 the disclosure of which is incorporated by reference herein.

BACKGROUND

Hand movements and hand signals are natural forms of human expression and communication. The application of this knowledge to human-computer interaction has led to the development of vision-based computer techniques that provide for human gesturing as computer input. Computer vision is a technique providing for the implementation of human gesture input systems with a goal of capturing unencumbered motions of a person's hands or body. Many of the vision-based techniques currently developed, however, involve awkward exercises requiring unnatural hand gestures and added equipment. These techniques can be complicated and bulky, resulting in decreased efficiency due to repeated hand movements away from standard computer-use locations.

Current computer input methods generally involve both text entry using a keyboard and cursor manipulation via a mouse or stylus. Repetitive switching between the keyboard and mouse decreases efficiency for users over time. Computer vision techniques have attempted to improve on the inefficiencies of human-computer input tasks by utilizing hand movements as input. This utilization would be most effective if detection occurred at common hand locations during computer use, such as the keyboard. Many of the current vision-based computer techniques employ the use of a pointed or outstretched finger as the input gesture. Difficulties detecting this hand gesture at or near the keyboard location result due to the similarity of the pointing gesture to natural hand positioning during typing.

Most current computer vision techniques utilize gesture detection and tracking paradigms for sensing hand gestures and movements. These detection and tracking paradigms are complex, using sophisticated pattern recognition techniques for recovering the shape and position of the hands. Detection and tracking is limited by several factors, including difficulty in achieving reasonable computational complexity, problems with actual detection due to ambiguities in human hand movements and gesturing, and a lack of support for techniques allowing more than one user interaction.

SUMMARY

This summary is provided to introduce simplified features and concepts of virtual controllers for visual displays, which is further described below in the Detailed Description. This summary is not intended to identify essential features of the claimed subject matter, nor is it intended for use in determining the scope of the claimed subject matter.

In one implementation of a virtual controller for visual displays, a camera or other sensor detects an image of one or more hands against a background. The image is segmented into hand areas and background areas and at various intervals the distinct, independent background areas—"holes"—formed in the image by the thumb and a finger making a closed ring are counted (e.g., one hole may be created by each hand). The thumb and forefinger, when used in this manner are referred to as a "thumb and forefinger interface" (TAFFI). Other types of hand and finger interfaces are possible. At least one control parameter is then assigned to each recognized hole, or independent area of background in the captured image, the control parameter typically allowing the user's hand to manipulate some aspect of a displayed image on a screen or monitor. For example, a mouse click function may be assigned as the control parameter when a thumb and forefinger of a hand touch each other to create a visually independent background area. Control parameters may be assigned so that the displayed image changes in relation to each change in a shape and/or a position of the independent area associated with the control parameter, or in relation to the independent area being formed or unformed (a high state when the thumb and forefinger touch and a low state when the thumb and forefinger open).

BRIEF DESCRIPTION OF THE DRAWINGS

The same numbers are used throughout the drawings to reference like features and components.

DETAILED DESCRIPTION

Overview

Figure 1:
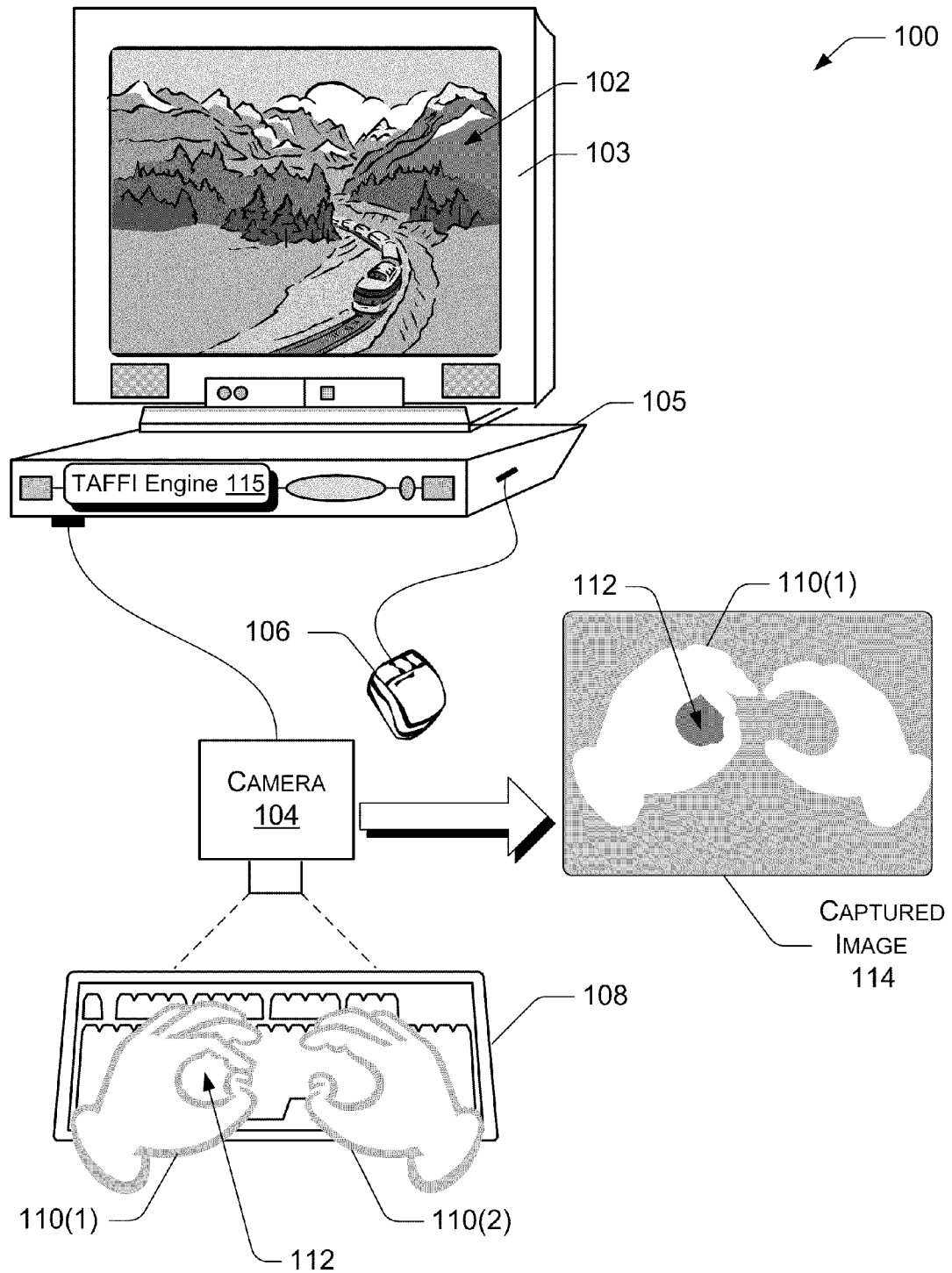
FIG. 1 is a diagram of an exemplary computer-based system in which an exemplary virtual controller for a visual display can be implemented.

This disclosure describes virtual controllers for visual displays. In one implementation, an exemplary system provides navigation of a display, such as the visual user interface typical of a computer monitor, by utilizing vision-based computer techniques as applied to hand and finger gestures. In one implementation, a user types on a keyboard and then, for example, invokes a "thumb and forefinger interface" or "TAFFI" by pausing the keyboard typing and merely touching a thumb and a finger of one hand together (as if holding a small stylus). The exemplary system senses this event and assigns control parameters to attributes of the independent area of background formed by the finger gesture, in order to control an image on the visual display.

The "virtual" of "virtual controller" refers to the absence of an apparatus in physical contact with the user's hand. Thus, in one implementation, the virtual controller consists of a camera positioned above hands and keyboard and associated logic to derive one or more interfaces from the visual image of the user's hands. Segmentation separates hand objects from background (e.g., including the keyboard). If the user touches forefinger to thumb (the TAFFI, above) the system recognizes and tabulates the independent area of background created by this hand gesture. That is, the system recognizes that a piece of the background has been visually isolated from the rest of the main background by the thumb and forefinger touching to make a complete closed "ring" that encloses an elliptically shaped "doughnut hole" of the background area. Detection of a visual image by means other than a computer camera is also possible. For example, a 2D array of electrodes or antennas embedded in a keyboard or a table could "image" the hand gesture using electrostatic or RF techniques and be processed in a manner similar to capturing the image from a camera.

In one implementation, an independent background area is deemed to be a distinct visual object when it is visually disconnected or isolated from other parts of the background by the hand areas, or in one variation, by hand areas in the image and/or the image border. When the image(s) of the hands and fingers are the delimiting entity for determining borders of an independent background area, then the ellipsoid area between thumb and forefinger of a hand that is created when the thumb and forefinger "close" (touch each other) is counted as a new independent background area approximately at the moment the thumb and forefinger touch. The new independent background area can be considered a "connected component" within the art of connected component(s) analysis. Such connected components, or new independent background areas—"holes"—will be referred to herein as "independent background areas" or just "independent areas." It should be understood that this terminology refers to a visual object that is deemed distinct, e.g., within the art of connected component(s) analysis.

When the thumb and forefinger "open," the newly formed independent background area evaporates and once again becomes part of a larger independent background area.

In terms of the art of connected components analysis, a connected component is a group of pixels in a binary image with like attributes that are grouped together on account of the attribute similarity. Each connected component often corresponds to a distinct visual object as observed by a human observer. Each part of the background that is visually independent from other parts of the background by part of the hand or finger areas of the image may be defined as an independent area or, in the language of connected components analysis, as a newly formed connected component distinct from the background connected component.

Of course, other implementations may use the movements or touching of other fingers of the hand to form a "hole" or "independent area." Thus, "TAFFI" should be construed loosely to mean a configuration of finger(s) and hand(s) that visually isolates part of the background from the rest of the general background. For example, the thumb and any other finger of the human hand, or just two fingers without the thumb, can also form a "TAFFI" interface. To streamline the description, however, implementations will typically be described in terms of "thumb and forefinger."

Once a detection module distinguishes the new independent background area from the general background area, the system associates the newly recognized independent area with one or more control parameters that enable the user to manipulate a displayed image on the visual user interface. The displayed image on the visual user interface can be changed via the control parameter as the position, shape, and even existence of the independent background area, are tracked.

In one implementation, an exemplary system provides for detection of more than one independent area, allowing a user control of the displayed image over multiple control parameters, in which one or both hands can participate. The association of multiple control parameters with multiple independent areas enables control of the displayed image relative to changes in shape, position, and existence of each detected independent area. Thus, manipulation of the displayed image may include control of clicking, selecting, executing, horizontal movement, vertical movement, scrolling, dragging, rotational movement, zooming, maximizing and minimizing, file functions, menu deployment and use, etc. Further, control parameters may also be assigned to relationships between multiple recognized independent areas. That is, as two independent areas move in relation to each other, for example, various control parameters may be attached to the distance between them. For example, as independent areas of each hand move away from each other the image may zoom or stretch, or may stretch in a dimension or vector in which the distance between independent areas is changing.

While features and concepts of the described systems and methods for virtual controllers can be implemented in many different environments, implementations of virtual controllers are described in the context of the following exemplary systems and environments.

Exemplary Environment

FIG. 1 illustrates an exemplary system 100 in which virtual controller interface techniques can be implemented, such as the thumb and forefinger interface, TAFFI, introduced above. The exemplary system 100 includes a "display image" 102 on a visual user interface (monitor, screen or "display" 103), a camera 104 coupled with a computing device 105, a mouse 106, a keyboard 108, a user's hands 110 shown in context (not part of the system's hardware, of course), and a visually independent area 112 formed by a user's hand 110(1) being used as a TAFFI. The camera obtains a captured image 114 of the hands to be used by an exemplary TAFFI engine 115. (The captured image 114 is shown only for descriptive purposes, the exemplary system 100 does not need to display what the camera captures.) The computing device 105 hosting the TAFFI engine 115 may be a desktop, laptop, PDA, or other computing device 105 that can successfully incorporate input from a camera 104 so that the TAFFI engine 115 can detect certain hand gestures and use these as user interface input.

The camera 104 captures an image of one hand 110(1) comprising a TAFFI while the other hand 110(2) remains in a "conventional" (non-TAFFI) typing position. The captured image 114 exhibits the detection of an independent area 112 for the hand 110(1) forming the TAFFI, but no detection of an independent area for the hand 110(2) that is still typing or using a mouse for additional input entry. The detection of the independent area 112 by the camera 104 is displayed as a darkened area (112) in the captured image 114. This captured image 114 demonstrates a phase in the process that will be described further below, in which the exemplary system 100 separates hands 110 and background into continuous, segmented areas, such as a large background area, the hand areas, and the smaller background area constituting the independent area 112 formed by the TAFFI of hand 110(1).

The system 100 can be a vision-based ("computer vision") system that provides control of the visual user interface via hand gesture input detected by the camera 104 or other sensor. In other words, the exemplary system 100 may control the visual user interface display output of many different types of programs or applications that can be operated on a computing device, including web-based displays. Thus, the exemplary system 100 can replace a conventional user input devices, such as mouse 106 and if desirable, the keyboard 108, including their functions of selecting, moving, and changing objects displayed in the visual user interface 102, or even inputting text.

The virtual controller detects particular hand gestures and movements as user input. In the illustrated embodiment, the camera 104 used for detection is placed somewhere above the hands and keyboard, attached to the display 103. The camera 104 placed in this position possesses a field of view that covers at least the majority of the keyboard 108 and is roughly focused at the plane of the user's hands 110 in the normal typing position. In one implementation, lights, such as infrared or visible LEDs, may be placed to illuminate the hands 110 and keyboard 108 and may also be positioned to mitigate the effects of changing ambient illumination. In some cases, ambient light may be sufficient, so that no extra lights are needed for the camera to obtain an image. In variations, the camera 104 and/or extra lights can be placed between various keys of the keyboard 108, such that the camera 104 faces upward and is able to detect hand gestures and movements of hands over the keyboard 108.

An example of a camera 104 that may be used in the illustrated exemplary system 100 is a LOGITECH Web camera 104 that acquires full resolution grayscale images at a rate of 30 Hz (Freemont, Calif.). The camera 104 can be affixed to either the keyboard 108 or display 103, or wherever else is suitable.

In the exemplary system 100, a user's hand 110(1) can form a TAFFI, which creates a visual area independent from the rest of the background area when thumb and forefinger touch. In one implementation, the potential TAFFI and presence or absence of one or more independent areas 112 are detected by a real-time image processing routine that is executed in the computing device 105 to continuously monitor and determine the state of both hands 110, for example, whether the hands 110 are typing or forming a gesture for input. This processing routine may first determine whether a user's thumb and forefinger are in contact. If the fingers are in contact causing an independent area 112 of a TAFFI formation to be recognized, the position of the contact can be tracked two-dimensionally. For example, the position of the thumb and forefinger contact can be registered in the computer 105 as the position of the pointing arrow, or the cursor position. This recognition of the TAFFI formation position and its associated independent area 112 are thus used to establish cursor position and to control the displayed image, in one implementation.

Rapid hand movements producing an independent area 112, where the independent area 112 is formed, unformed, and then formed again within an interval of time, can simulate or mimic the "clicking" of a mouse and allow a user to select an item being displayed. The quick forming, unforming, and forming again of an independent area 112 can further enable the user to drag or scroll selected portions of the displayed image, move an object in horizontal, vertical, or diagonal directions, rotate, zoom, etc., the displayed image 102. Additionally, in one implementation, moving the TAFFI that has formed an independent area 112 closer to or farther away from the camera 104 can produce zooming in and out of the displayed image.

Control of a displayed image via multiple TAFFIs may involve more than one hand 110. The illustrated exemplary system 100 of FIG. 1 is an embodiment of TAFFI control in which image manipulation proceeds from a TAFFI of one hand 110(1) while the opposing hand 110(2) types and performs other input tasks at the keyboard 108. But in another embodiment of TAFFI control, both hands 110 may form respective TAFFIs, resulting in detection of at least two independent areas 112 by the camera 104. Two-handed TAFFI control can provide input control for fine-tuned navigation of a visual user interface. The two-handed approach provides multi-directional image manipulation in addition to zooming in, zooming out, and rotational movements, where the manipulation is more sophisticated because of the interaction of the independent areas 112 of the multiple TAFFIs in relation to each other.

Exemplary System

Figure 2:
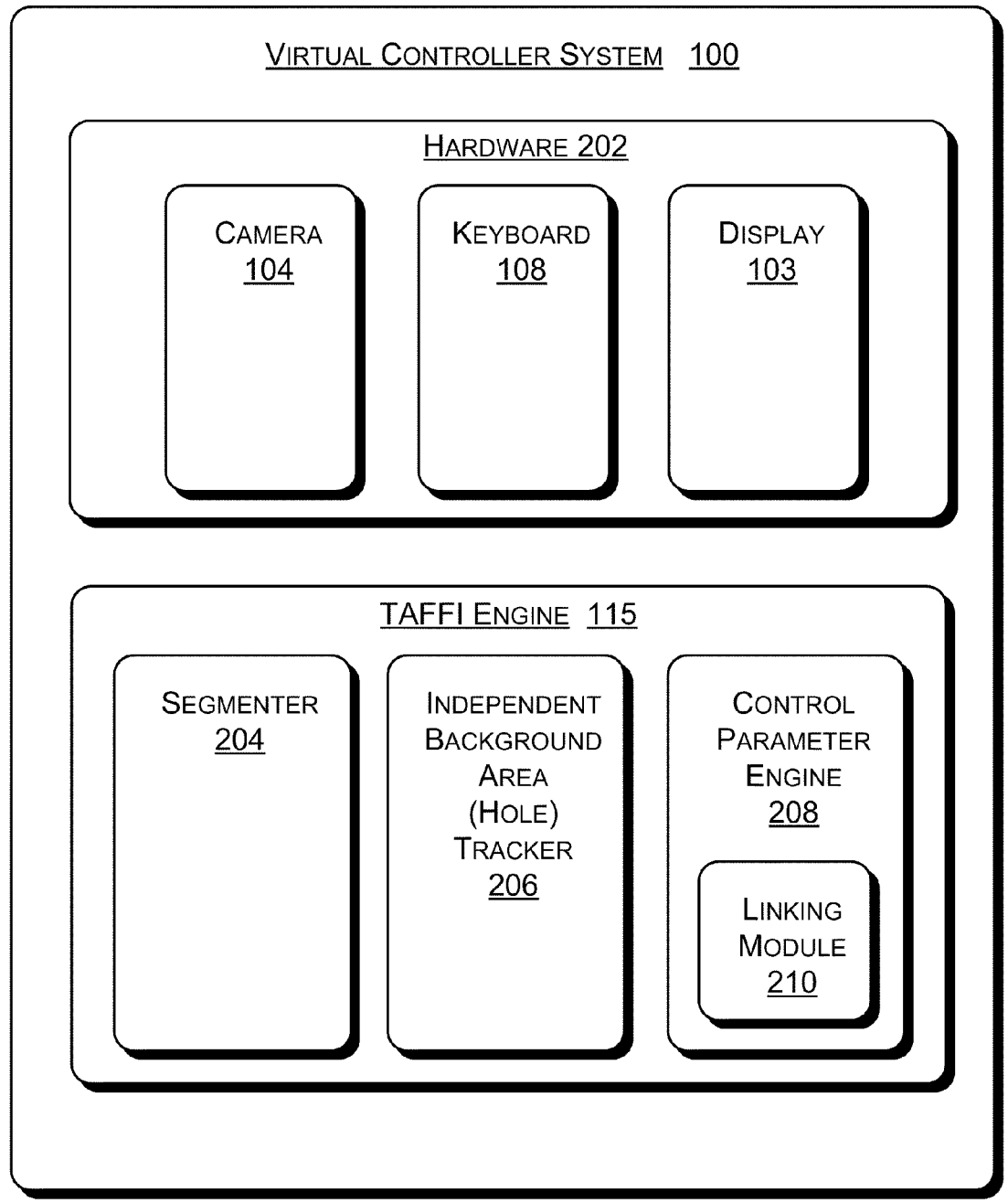
FIG. 2 is a block diagram of an exemplary virtual controller system.

FIG. 2 illustrates various components of the exemplary virtual controller system 100. The illustrated configuration of the virtual controller system 100 is only one example arrangement. Many arrangements of the illustrated components, or other similar components, are possible within the scope of the subject matter. The exemplary virtual controller system 100 has some components, such as the TAFFI engine 115, that can be executed in hardware, software, or combinations of hardware, software, firmware, etc.

The exemplary system 100 includes hardware 202, such as the camera 104 or other image sensor, keyboard 108, and display 103. The TAFFI engine 115 includes other components, such as an image segmenter 204, an independent area tracker 206, a control parameter engine 208, including a linking module 210.

In one implementation, the camera 104 detects an image interpreted as one or more hands 110 against a background. The pixels of the captured image 114 include contrasting values of an attribute that will be used to distinguish the hands 110 in the image from the background area(s) in the image. Eligible attributes for contrasting hands from background may include brightness, grayscale, color component intensity, color plane value, vector pixel value, colormap index value, etc. In variations, the camera 104 may utilize one or other of these attributes to distinguish hand pixels from background pixels, for instance, depending on if infrared illumination is used instead of the typical visible spectrum. Sometimes, obtaining the captured image 114 using infrared results in the hands of most people of different skin tones appearing with similar contrast to the background regardless of variations in skin color and tone in the visible spectrum due to difference in race, suntan, etc. Thus, detection of hands against a background in the image may be readily accomplished in the infrared without regard to visible skin tones.

The segmenter 204 thus separates the captured image 114 into one or more hand areas 110 and the background area(s), e.g., by binary image segmentation according to the contrast or brightness attributes described above. The binary image segmentation distinguishes background area pixels from pixels of any other (foreground) object or area present in the captured image 114. In one implementation, the segmenter 204 separates an image by first determining pixels that correspond to the background area. The background area pixels are each assigned a value, such as binary "ones" (1s). The remaining pixels in the captured image 114 are each assigned a different value, such as "zeros" (0s).

Figure 3:
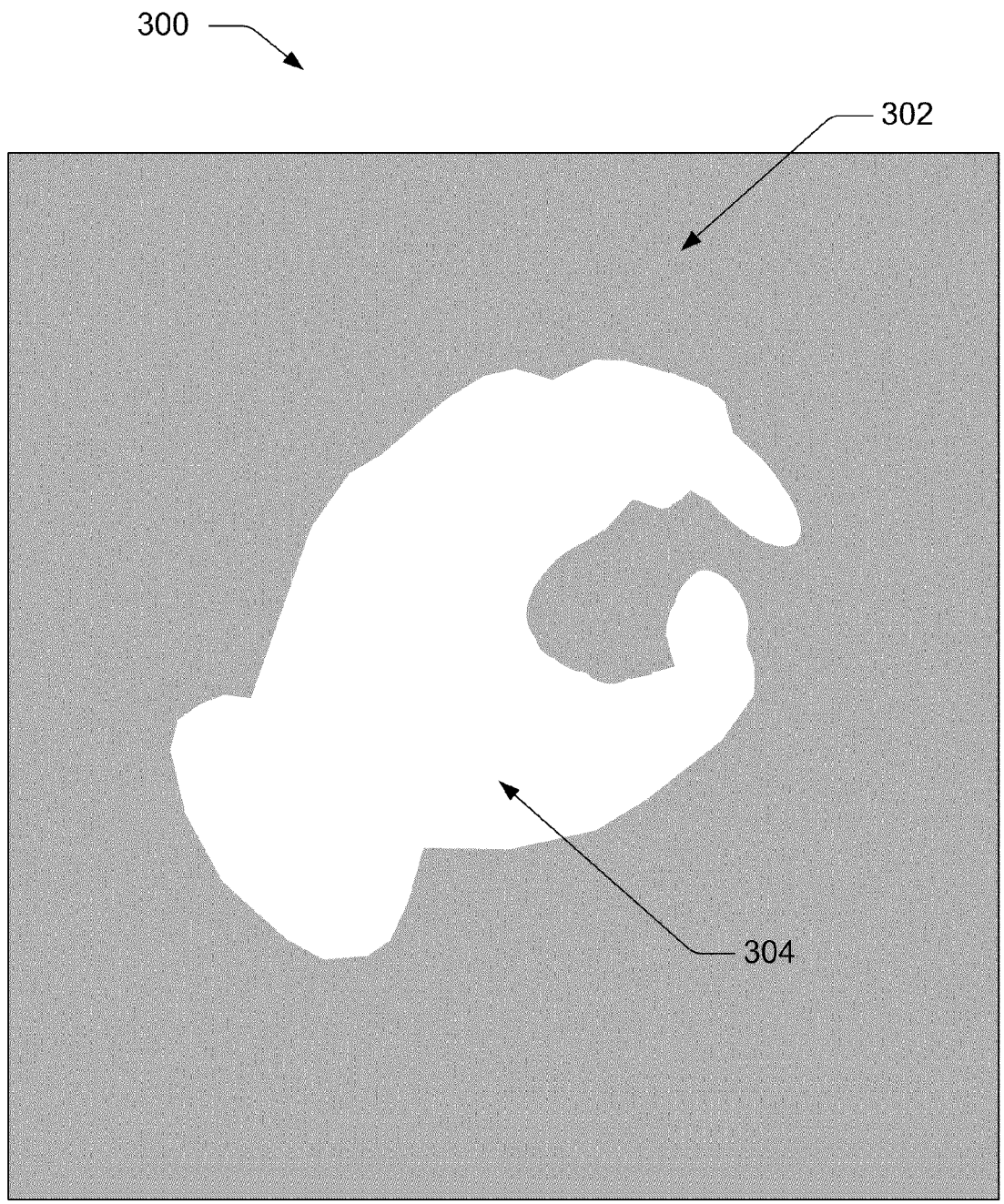
FIG. 3 is a diagram of image segmentation used in an exemplary segmenter of the virtual controller system of FIG. 2.

FIG. 3 illustrates an example 300 of binary image segmentation performed by the segmenter 204. The captured image 114 includes a background object 302 and a hand object 304 in the foreground. A variety of techniques exist for producing segmented images, most of which are well known in the art. In one implementation, the segmenter 204 discerns the background area pixels from the pixels of any other object or area that is present in the captured image 114 or in example 300. Distinguishing pixels in a binary image is accomplished by considering each pixel corresponding to the background as "on," or as a particular value, such as "one." Every other pixel value in an image can then be compared to the value of the stored background image. Any other pixel value that is significantly brighter than the corresponding background pixel value is deemed part of a new area or image object, and is labeled "off," or given a different value, such as "zero."

Example 300 can also illustrate distinction of the background area 302 from other areas of an image, as a color difference. The background area 302 is shown as a darker color that is equated with a first value. The hand object 304 shown as a lighter color is equated with a second value, distinguishing it from the background area 302.

Returning to FIG. 2, the independent area tracker 206 determines, at fixed time intervals, a number of independent areas 112 of the background. Each part of the background that is visually independent from other parts of the background by at least a part of the non-background hand areas (or the image border) is defined as an independent area 112. For each independent area 112 sensed, the independent area tracker 206 finds an area of "1" pixels completely surrounded by "0" pixels (i.e., no longer continuously connected to the rest of the "1" pixels comprising the main background). In other words, the independent area tracker 206 finds areas of isolated background that are circumscribed by a touching thumb and forefinger gesture of a TAFFI.

Accurate detection of an independent area 112 as a separate area of the background indicating the user's intention to select an object on the display 103, for example, can be ensured when the independent area lies entirely within the captured image 114 sensed by the camera 104, i.e., when no portion of the independent area 112 lies on the border of the captured image 114.

Nonetheless, in one implementation, a variation of the independent area tracker 206 can sense an independent area 112 even when part of the independent area 112 is "off screen"—not included as part of the captured image 114. This can be accomplished by defining an independent area 112 as an area of background cut off from the main background by part of a hand 110 or by part of the border of the captured image 114. But this is only a variation of how to delimit an independent area of background.

Once the existence of one or more independent areas is established, the linking module 210 associates a control parameter for the manipulation of a visual image display 102 on a user interface with each counted independent area. Manipulation can include a number of mechanisms, including cursor control within a visual user interface. Cursor control of a visual image display 102 can be accomplished, but only when the independent area is detected and associated with the control parameter. If detection of the independent area ceases, the control parameter association ceases, and cursor control and manipulation is disabled. Cursor control may include a number of manipulations, including a "clicking" action mimicking input from a mouse. The clicking action provides for the selection of a desired portion of the visual image display 102, tracking and dragging, and multi-directional movement and control of the cursor.

The linking module 210 provides for association of a specific control parameter with a hand or finger gesture or with a gesture change. Once a control parameter is assigned or associated with a hand or finger gesture, then the control parameter engine 208 may further nuance how the hand gesture and the control parameter relate to each other. For example, the mere touching of thumb to forefinger may be used as an "on-off," binary, high-low, or other two-state interface or switch. Whereas a hand gesture attribute that can change continuously may be assigned to provide variable control over a display image manipulation, such as gradual movements of the display image 102 over a continuum.

When the linking module 210 assigns a variable control parameter to control of the displayed image 102, e.g., in relation to changes in shape or position of a corresponding independent area, the variability aspect can be accomplished by calculating the mean position of all pixels belonging to each independent area and then tracking the changes in the position of the shape created when a hand forms a TAFFI. Movement of the hands alters the orientation of the ellipsoidal shape of the independent areas and causes corresponding changes in the display attribute associated with the assigned control parameter.

Control of the Displayed Image

Figure 4:
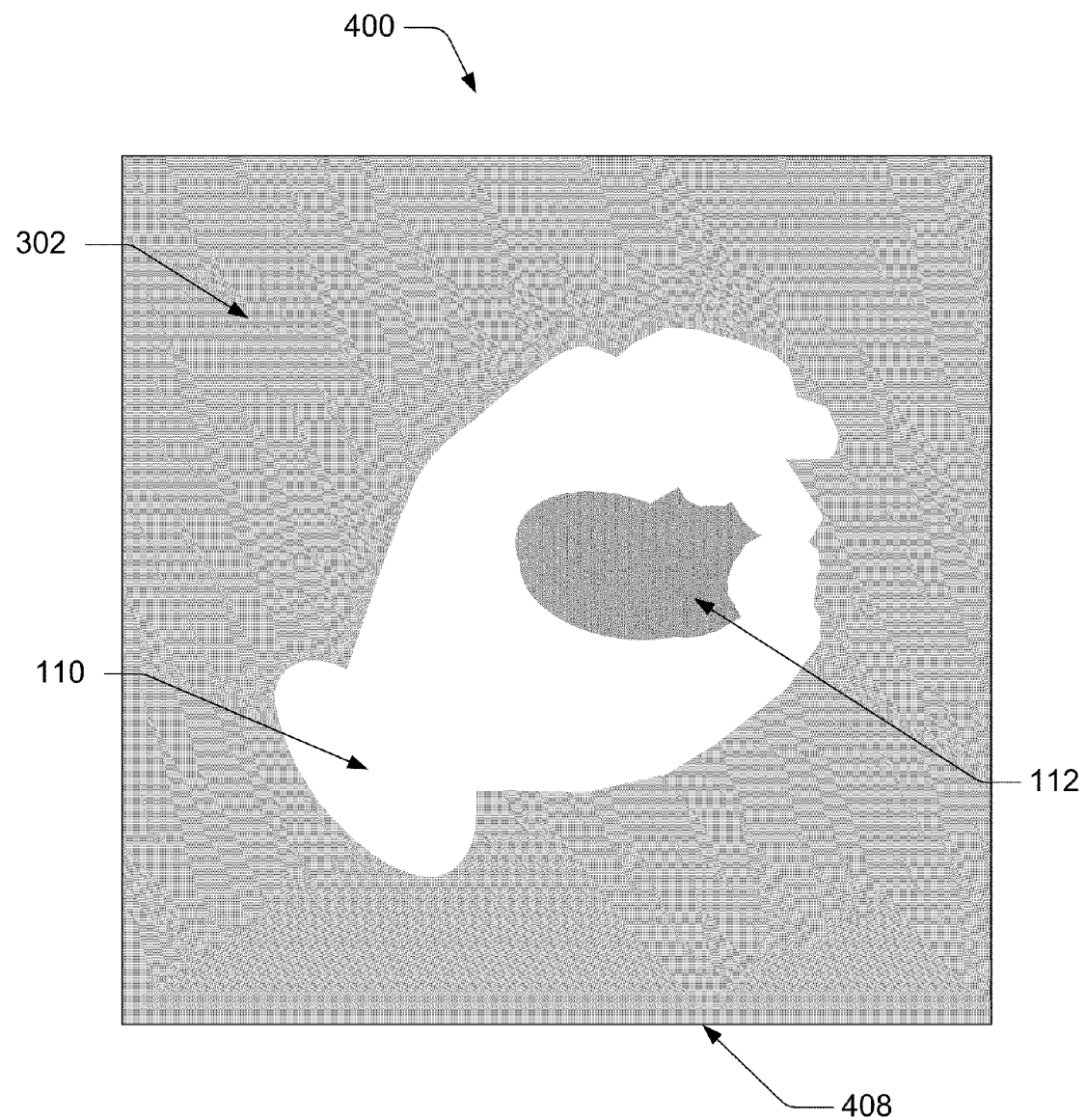
FIG. 4 is a diagram of exemplary thumb and forefinger interface control.

FIG. 4 shows an example TAFFI 400 illustrated within the context of a captured image 114. The illustrated part of the captured image 114 includes a background area 302, a hand object area 110, an independent area 112, and an image border 408. Each of the areas 302, 110, and 406 can be described as distinct connected areas, or connected components. The TAFFI engine 115 distinguishes independent area 112 from the other connected components 302 and 110.

A TAFFI engine 115 may thus use computation of connected components of an image as the basis for implementation of a virtual controller for visual displays. In greater detail, connected components are a subset of pixels or a region of an image in which every pixel is "connected" to every other pixel in the subset. The term "connected" denotes a set of pixels for which it is possible to reach every pixel from any other pixel by traversing pixels that belong to the set. Efficient techniques currently exist for computing a set of connected components in an image. Connected component techniques can be efficient avenues for determining properties of shapes in an image because they allow for the examination of small sets of components consisting of many pixels within the pixels of the entire image.

The process of computing connected components can give rise to detection of extraneous connected components. These unneeded detections may confuse the determination of relevant independent areas formed by TAFFIs or other exemplary interfaces, and therefore impede the implementation of a virtual controller. In one implementation, extraneous detection of extra connected components can be overcome by discarding connected components that have a fewer number of pixels than a predetermined allowable threshold.

In one implementation, the TAFFI engine 115 verifies that a recognized independent area 112 lies entirely within the borders of the image, i.e., entirely within confines of a background area 302. Sometimes this limited detection of an independent area 112 that is of sufficient size and includes no pixels on the border 408 of the image reinforces reliable identification of desired independent areas 406. In this one implementation, appropriate detection is accomplished by avoiding false connected component candidates, or those that do not lie entirely within the image and which contain portions on the border 408 of the image.

Yet, in another implementation, the TAFFI engine 115 detects an independent area 112 by detecting a portion of the independent area 112 within the captured image 114 and a portion lying off-screen over the border 408 of the image. In this implementation, connected component analysis proceeds as long as the independent area 112 is contiguous up to the point of encountering and/or surpassing the border 408 of the image. This may occur when the hand forming the TAFFI and independent area 112 is only partially within the field of view of the camera, and therefore only partially within the detected image.

In one implementation, the TAFFI engine 115 uses the center of the independent area 112 to establish a cursor position and cursor control within the displayed image 102. The TAFFI engine 115 may perform statistical analysis for each recognized independent area 112, where independent area tracker 206 computes the "centroid" or mean pixel position of all pixels belonging to each independent area 112. This calculated position is the sum of many pixel positions, resulting in stability and precision for this implementation. The mean pixel position can be computed at the same stage as computing connected components, resulting in an efficient technique that provides rapid results at low processing cost.

Regarding the appearance and disappearance of independent areas 406 as a means of controlling a visual display, in one implementation mean pixel position of all pixels belonging to an independent area 112 establishes cursor position and control only when the independent area 112 is newly detected during one interval of a repeating detection process.

Cursor control with detection of an independent areas 406 can mimic a mouse input device 106. Analogous to the mouse 106, relative motion for cursor manipulation can be computed from the current and past position of the detected independent area 112 formed by a TAFFI 400. The joining together of a thumb and forefinger is a natural motion that allows for an effortless clutching behavior, as with a mouse input device. The use of a Kalman filter with TAFFI detection can smooth the motion of the cursor on the visual display 103.

The exemplary TAFFI engine 115 supports selecting objects of the displayed image 102 by rapid forming, unforming, and reforming of an independent area 112 with in a threshold time interval. These actions mimic the "clicking" of a mouse button for "selecting" or "executing" functions, and may also support transitioning from tracking to dragging of a selected object. For example, dragging may be implemented by mimicking a "mouse-down" event immediately following the latest formation of an independent area 112. The corresponding "mouse-up" event is generated when the independent area 112 evaporates by opening thumb and forefinger. For example, at the moment of independent area formation, an object, such as a scroll bar in a document on the visual user interface display, can be selected. Immediately following this selection, the position of the hand forming the independent area 112 can be moved in the same manner that a mouse 106 might be moved for scrolling downward in a document.

The TAFFI engine 115 can provide more control of a visual display 102 than just mimicking a conventional mouse-based function. The mean and covariance of the pixel positions of an independent area 112 (connected component) can be related to an oriented ellipsoidal model of the shape of the independent area 112 by computing the eigenvectors of the covariance matrix of pixel positions. The square root of the magnitude of the eigenvalues gives its spatial extent, of major and minor axes size, while the orientation of the ellipse is determined as the arctangent of one of the eigenvectors, up to a 180-degree ambiguity. The resultant ambiguity can be addressed by taking the computed orientation or the +180 degree rotated orientation to minimize the difference in orientation from the previous frame.

The TAFFI engine 115 may compute simultaneous changes in position, orientation, and scale from the ellipsoidal model of the independent area 112 created by an exemplary TAFFI 400. In various implementations, changes in scale can also be used to detect movement of the hand towards the camera and away from the camera. This assumes that the user's hand forming an independent area 112 is generally kept within a fixed range of distances from the camera 104 so that the size and shape of the independent area 112 vary only within tolerances, so that visual changes in orientation are somewhat limited to the plane of the background area 302, or keyboard. In one implementation, an important consideration is that throughout the interaction the user must maintain the size of the independent area—the size of the ellipsoidal hole formed by the TAFFI 400—as the user moves hands up and down relative to the camera or keyboard (i.e., in some implementations, change in height is confounded with real change in the shape of the independent area). In other implementations, the TAFFI engine 115 compensates for changes in size of the independent area as a hand moves up and down, using computer vision logic.

In one exemplary implementation, the TAFFI engine 115 uses the ellipsoidal model of the independent area 112 for one-handed navigation of aerial and satellite imagery, such as that provided by the WINDOWS® LIVE VIRTUAL EARTH® web service, or other similar Internet map services (Redmond, Wa). Navigation by movement across the entire view of the virtual map can be accomplished by a TAFFI 400 with an independent area 112 that moves across a background area 302, such as a table or keyboard. Rotation of the entire map can be accomplished by rotating the hand forming the independent area 112 within the 2-dimensional plane of the keyboard, while zooming-in and zooming-out functions are achieved by moving the hand closer or farther from the camera 104.

The TAFFI engine 115 can implement the use of two or more hands for cursor control and navigation. A frame-to-frame correspondence strategy allows each independent area 112 to be continuously tracked as either the first, second, third, etc., area detected by a camera for input. The placement of both hands against a background area 302 for detection by a camera, and the subsequent movement of the hands in relation to the background area 302, alters the orientation of the ellipsoidal model of the independent areas 406 and causes movement of the visual user interface display associated with the position and location of the hand movements via the control parameters assigned by the linking module 210.

The simultaneous tracking of multiple control parameters corresponding to multiple hand or finger gestures enables a variety of bimanual interactions. Referring again to the Internet virtual map example, two-handed input for the navigation of the virtual map allows simultaneous changes in rotation, translation, and scaling of the map view on the display 103. Because location estimates for independent areas 406 are derived from the position of the hands, the two-handed technique can provide more stable estimates of motion than that of the one-handed technique. The two-handed technique thus provides for: clockwise and counterclockwise rotation, where both hands simultaneously move in the direction of rotation; movement of the entire visual user interface display view in vertical or horizontal directions, where both hands move in the desired direction; and zooming functions, where zooming in of the visual user interface display is accomplished when both hands begin close together and later stretch apart from one another, and zooming out of the visual user interface display is performed by bringing hands together from a separated starting position.

Figure 5:
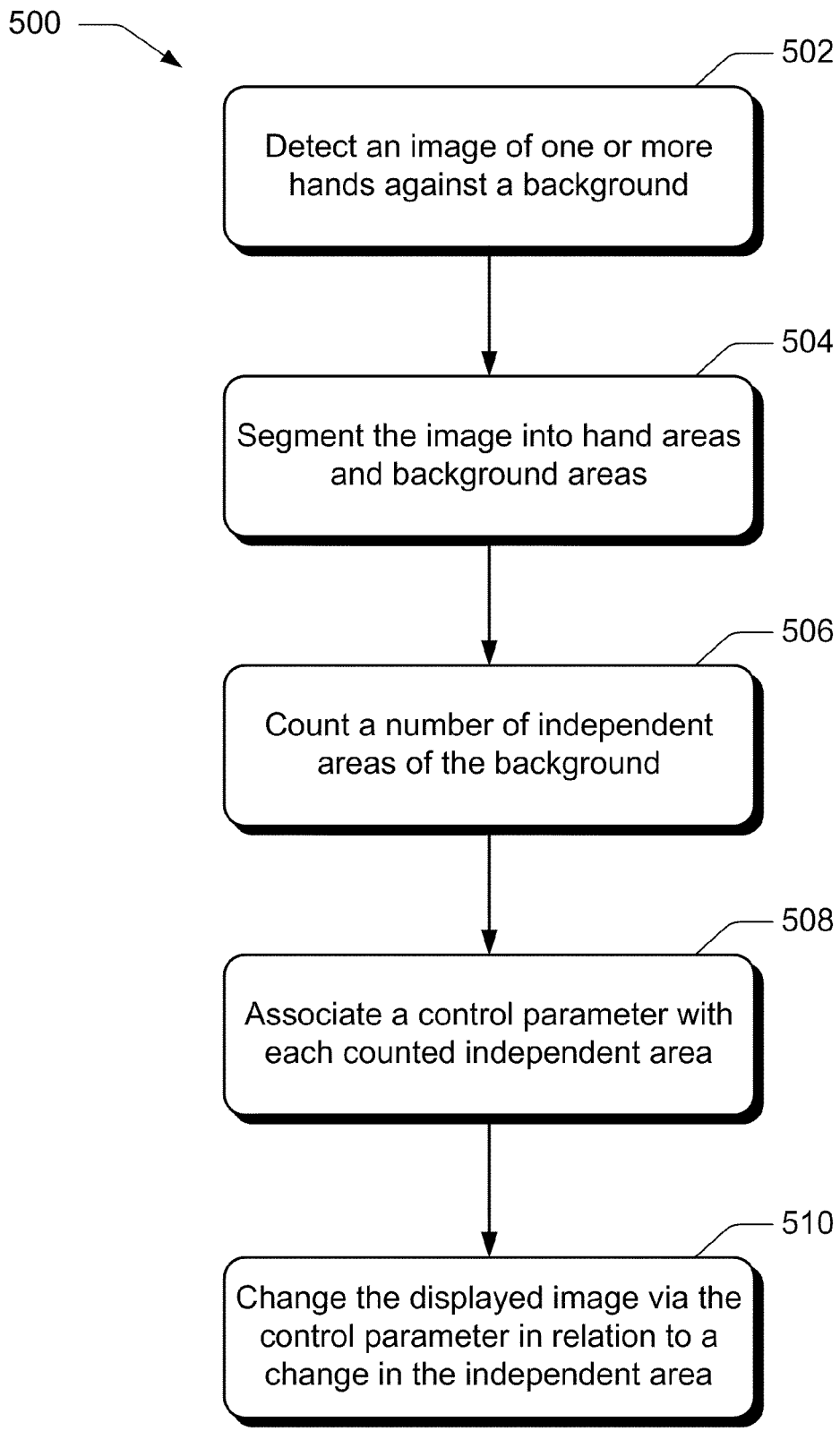
FIG. 5 is a flow diagram of an exemplary method of controlling a visual display with hand and finger gestures.

Simultaneous changes in position, orientation, and scale computed from the ellipsoidal model of an independent area 112 can be used in implementations other than standard computing device environments. For example, the TAFFI engine 115 may control interactive table surface systems that include a camera and a projector on a table, but no traditional input devices such as a mouse, touchscreen, or keyboard. A user places hands over the table surface, forming independent areas 406 to provide manipulation and interaction with the table surface and the material displayed on the surface. A similar implementation may include a system that projects a display image onto a wall, where a user can interact and control the display image through hands and fingers acting as TAFFIs 400. For example, the TAFFI engine 115 may allow the user to change slides during a projector presentation Exemplary Method FIG. 5 shows an exemplary method 500 of controlling a visual display via a hand or finger gesture. In the flow diagram, the operations are summarized in individual blocks. Depending on implementation, the exemplary method 500 may be performed by hardware, software, or combinations of hardware, software, firmware, etc., for example, by components of the exemplary virtual controller system 100 and/or the exemplary TAFFI engine 115.

At block 502, an image of one or more hands 110 against a background via a camera 104 is captured. Contrast, color, or brightness may be the pixel attribute that enables distinguishing between the hands and surrounding background area. Hands are sensed more easily against a contrasting background. One scenario for sensing hands is while typing at a keyboard 108. A camera 104 captures an image of the hands 110 and the keyboard 108 sensed as part of the background area. Infrared LED illumination may also be used for this method, which offers controlled lighting making most hands appear similar to the camera 104 in skin tone.

At block 504, the image is segmented into hand objects and background areas by binary segmentation. For example, the background area pixels are identified and distinguished from the pixels of any other object or area in the image. The background area pixels are then labeled with a value. The pixels of other objects or areas in the image are subsequently identified and compared to the value of the pixels of the stored background image. Any pixel value significantly brighter than the corresponding background pixel value is labeled part of a new area or image, and given a different value from the background area pixels. This distinction and labeling of differing areas of an image is binary segmentation of the image.

At block 506, a number of independent areas of the background are counted in repeating detection intervals. Independent areas 406 are defined as each part of the background 302 that is visually independent from other parts of the background by at least a part of one of the hand objects 110. For example, when a hand acts as a thumb and forefinger interface, or TAFFI, the thumb and forefinger of the hand create an enclosed area, independent from the rest of the general background area. This enclosed area forms a new independent area 112 to which a control parameter for manipulating a visual display can be attached. In one implementation, the method tests whether the detected independent areas are really independent, i.e., in one case, whether an independent area has pixels on the border of the image.

At block 508, a control parameter for manipulating an image on a display is associated with each counted independent area or attribute thereof. For example, an independent area 112 created by a hand used as a TAFFI is sensed by the camera 104 and is correlated with a control parameter enabling the user to select an object on the user interface display. Subsequently, a second sensed independent area 112 is correlated with a user interface control parameter, enabling the user to move the previously selected object to a different location on the user interface display. This rapid succession of sensing a first and second independent area 112 can result from a quick forming, unforming, and reforming the independent areas 406, resulting in a mouse-like "clicking" function associated with a sensed independent area 112.

At block 510, the displayed image is changed via the control parameter in relation to each change in the attribute of the independent area that is assigned to the control parameter. For example, the position of an independent area 112 may move left or right in relation to the sensing camera 104 and the displayed image 102 may follow suit. The association of the sensed independent area 112 with a control parameter allows the manipulation of the displayed visual image 102 according to the movement, position, and relation of the hands being used as TAFFIs.

The above method 500 and other related methods may be implemented in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
    detecting an image of one or more skeletal body portions against a substantially stationary background via an image sensor;
    segmenting the image into skeletal body portion areas and background areas;
    at intervals, counting a number of independent areas of the background, wherein each part of the background that is visually independent from other parts of the background is defined as an independent area, each independent area being visually separate from the other parts of the background by at least a part of the skeletal body portion areas;
    associating a control parameter for manipulating a displayed image on a user interface with a predefined region of each counted independent area; and
    changing the displayed image via the control parameter in relation to each change in a shape and/or a position of the independent area associated with the control parameter.

2. The method as recited in claim 1, further comprising dissociating a control parameter from an associated independent area when the independent area becomes connected again.

3. The method as recited in claim 1, wherein the control parameter comprises emulating an actuation of a mouse button when an independent area: forms, unforms, and reforms within a threshold time interval.

4. The method as recited in claim 1, wherein the control parameter comprises emulation and movement of a mouse pointer.

5. The method as recited in claim 1, wherein the control parameter comprises movement of a cursor.

6. The method as recited in claim 1, wherein the control parameter comprises movement of the displayed image with respect to the user interface.

7. The method as recited in claim 6, wherein the movement comprises one of: vertical movement, horizontal movement, or rotational movement.

8. The method as recited in claim 1, wherein the control parameter comprises zooming or reducing a size of the displayed image on the user interface.

9. The method as recited in claim 1, further comprising associating the control parameter with a relation between two independent areas, each independent area formed by an image of a respective skeletal body portion.

10. The method as recited in claim 9, wherein the control parameter comprises stretching the displayed image in relation to a changing distance between the two independent areas.

11. The method as recited in claim 9, wherein the control parameter associated with the relation between two independent areas controls one of:
  rotating the displayed image in relation to rotation of a line between the two independent areas;
  rotating the displayed image in a clockwise or a counter-clockwise direction when both independent areas move in a similar arc direction;
  moving the entire displayed image when both independent areas move simultaneously in the same direction; and
  zooming the displayed image when the distance between independent areas changes.

12. The method as recited in claim 1, wherein a thumb area and a forefinger area of a skeletal body portion area defines a thumb and forefinger interface (TAFFI), the thumb area and the forefinger area visually touching each other to visually disconnect a part of the background from the other parts of the background to form an independent area.

13. A system, comprising:
  an image sensor to detect an image including one or more skeletal body portions against a substantially stationary background;
  an image separator to segment the image into one or more skeletal body portion areas and the background;
  a calculation module to count, at intervals, a number of independent areas of the background, wherein each part of the background that is visually independent from other parts of the background is defined as an independent area, each independent area being visually separated from the other parts of the background by at least a part of the skeletal body portion areas;
  a linking module to associate a control parameter on a user interface with a predefined region of each counted independent area; and
  wherein each change in a shape and/or a position of the independent area associated with the control parameter initiates an action via the control parameter.

14. A system as recited in claim 13, wherein when the independent area becomes connected again the linking module dissociates the respective control parameter.

15. A system as recited in claim 13, wherein the linking module associates a control parameter that emulates an actuation of a mouse button when an independent area forms, unforms, and reforms within a threshold time interval.

16. A system as recited in claim 13, wherein the linking module associates a control parameter to emulate a movement of a visual indicator selected from the group of visual indicators consisting of an image of a mouse pointer, an image of a cursor, and at least part of a displayed image on the user interface and wherein the movement comprises a movement selected from the group of movements consisting of a vertical movement, a horizontal movement, a rotational movement, a zooming-in movement, and a zooming-out movement.

17. A system as recited in claim 13, wherein the linking module associates the control parameter with a relation between two independent areas, each independent area formed by an image of a respective skeletal body portion.

18. A system as recited in claim 17, wherein the linking module associates a control parameter to stretch a displayed image on the user interface in relation to a changing distance between the two independent areas.

19. A system as recited in claim 17, wherein the linking module associates a control parameter to rotate a displayed image on the user interface in relation to a rotation of a line between the two independent areas.

20. A system for changing a displayed image on a user interface via a control parameter assigned to a movement of a skeletal body portion, the system comprising:
  means for detecting an image of one or more skeletal body portions against a substantially stationary background;
  means for segmenting the image into one or more skeletal body portion areas and the background;
  means for counting, at fixed intervals, a number of independent areas of the background, wherein each part of the background that is visually independent from other parts of the background, and visually separated by at least a part of a skeletal body portion area from the other parts of the background, is defined as an independent area;
  means for associating a control parameter on the user interface with a predefined region of each counted independent area and initiating an action via the control parameter in relation to each change in a shape and/or a position of the independent area associated with the control parameter.

* * * * *